(12) United States Patent
Liu et al.

(10) Patent No.: US 9,876,744 B2
(45) Date of Patent: Jan. 23, 2018

(54) INFORMATION SENDING METHOD AND INFORMATION SENDING APPARATUS

(71) Applicant: Beijing Zhigu Rui Tuo Tech Co., Ltd, Beijing (CN)

(72) Inventors: Jia Liu, Beijing (CN); Wei Shi, Beijing (CN)

(73) Assignee: BEIJING ZHIGU RUI TUO TECH CO., LTD, Beijing (CN)

(*) Notice: Subject to any disclaimer, the term of this patent is extended or adjusted under 35 U.S.C. 154(b) by 0 days.

(21) Appl. No.: 15/117,188

(22) PCT Filed: Jan. 15, 2015

(86) PCT No.: PCT/CN2015/070774
§ 371 (c)(1),
(2) Date: Aug. 6, 2016

(87) PCT Pub. No.: WO2015/143934
PCT Pub. Date: Oct. 1, 2015

(65) Prior Publication Data
US 2017/0005966 A1 Jan. 5, 2017

(30) Foreign Application Priority Data
Mar. 24, 2014 (CN) .......................... 2014 1 0111323

(51) Int. Cl.
*H04W 4/00* (2009.01)
*H04L 12/58* (2006.01)
(Continued)

(52) U.S. Cl.
CPC .............. *H04L 51/14* (2013.01); *G08B 7/06* (2013.01); *H04L 51/04* (2013.01); *H04W 4/12* (2013.01); *H04W 4/14* (2013.01)

(58) Field of Classification Search
CPC ........... H04L 51/14; H04L 51/04; G08B 7/06; H04W 4/12; H04W 4/14
(Continued)

(56) References Cited

U.S. PATENT DOCUMENTS 8,166,164 B1 * 4/2012 Luna .................. H04L 67/22
709/203
8,457,604 B2 6/2013 Pereira et al.
(Continued)

FOREIGN PATENT DOCUMENTS

CN 1472947 2/2004
CN 1917483 2/2007
(Continued)

OTHER PUBLICATIONS

International Search Report for PCT Application No. PCT/CN2015/070774, dated Apr. 21, 2015, 2 pages.
(Continued)

*Primary Examiner* — Marceau Milford
(74) *Attorney, Agent, or Firm* — Amin, Turocy & Watson, LLP

(57) ABSTRACT

An information sending method and an information sending apparatus are provided, which relate to the field of wireless communication processing technologies. A method includes receiving target information sent to at least one target receiving device by a sender, and determining, according to state information of a receiver device corresponding to the at least one target receiving device, a forwarding policy of forwarding the target information to the receiver device. A sending policy can be determined according to state information of a receiver device, so that a receiver acquires information as much as it does not change a current state, thereby improving user experience of the receiver.

31 Claims, 3 Drawing Sheets

(51) Int. Cl.
*H04W 4/12* (2009.01)
*G08B 7/06* (2006.01)
*H04W 4/14* (2009.01)

(58) Field of Classification Search
USPC ........................................................ 455/466
See application file for complete search history.

(56) References Cited

U.S. PATENT DOCUMENTS

| | | | |
|---|---|---|---|
| 8,812,695 B2* | 8/2014 | Luna | H04L 43/10 709/223 |
| 8,832,228 B2* | 9/2014 | Luna | G06F 9/5027 709/217 |
| 2008/0057925 A1* | 3/2008 | Ansari | H04M 1/72552 455/414.4 |
| 2012/0110110 A1* | 5/2012 | Luna | H04L 67/22 709/213 |
| 2012/0151044 A1* | 6/2012 | Luna | H04W 4/18 709/224 |
| 2012/0290717 A1* | 11/2012 | Luna | H04L 67/1095 709/224 |
| 2013/0219381 A1* | 8/2013 | Lovitt | G06F 8/65 717/173 |
| 2013/0311594 A1* | 11/2013 | Luna | H04L 43/065 709/213 |
| 2014/0052818 A1 | 2/2014 | Alkove et al. | |
| 2014/0067507 A1 | 3/2014 | Costello et al. | |
| 2015/0023160 A1* | 1/2015 | Alisawi | H04L 47/32 370/230 |
| 2015/0023161 A1* | 1/2015 | Alisawi | H04W 28/0236 370/230 |
| 2015/0088934 A1* | 3/2015 | Beckman | G06F 21/6227 707/781 |
| 2015/0237128 A1* | 8/2015 | Castro | H04L 67/1095 709/203 |

FOREIGN PATENT DOCUMENTS

| | | |
|---|---|---|
| CN | 101146244 A | 3/2008 |
| CN | 101622640 A | 1/2010 |
| CN | 101790137 A | 7/2010 |
| CN | 102137346 A | 7/2011 |
| CN | 103002595 A | 3/2013 |
| CN | 103166998 A | 6/2013 |
| CN | 103167445 A | 6/2013 |
| CN | 103581966 | 2/2014 |
| CN | 103634275 | 3/2014 |
| CN | 103888346 | 6/2014 |
| CN | 103888916 A | 6/2014 |
| KR | 100899872 B1 | 5/2009 |
| WO | 2008027609 A1 | 3/2008 |

OTHER PUBLICATIONS

International Search Report for PCT Application No. PCT/CN2015/070769, dated Apr. 21, 2015, 2 pages.

* cited by examiner

INFORMATION SENDING METHOD AND INFORMATION SENDING APPARATUS

RELATED APPLICATION

The present application is a U.S. National Stage filing under 35 U.S.C. §371 of international patent cooperation treaty (PCT) application No. PCT/CN2015/070774, filed Jan. 15, 2015, and entitled "INFORMATION SENDING METHOD AND INFORMATION SENDING APPARATUS", which claims the benefit of priority to Chinese Patent Application No. 201410111323.8, filed on Mar. 24, 2014 which applications are hereby incorporated into the present application herein by reference in their respective entireties.

TECHNICAL FIELD

The present application relates to the field of wireless communication technologies, and in particular, to an information sending method and an information sending apparatus.

BACKGROUND

Smart devices usually have a separate operating system, where users can install various applications provided by third-party service providers, such as games, instant messaging and navigation, and development of the smart devices bring about more and more conveniences to the users. There are many types of smart devices, such as, smart phones, wearable smart devices (watches, glasses, etc.), and vehicle-mounted smart devices. Such devices may also have a variety of communication manners, for example, traditional voice and short message communication manners, in addition, communication may also be conducted by using various applications such as instant messaging (IM) (for example, WeChat, and QQ) and microblogging (which may also realize instant messaging).

Abundant applications, on one hand, bring about more choices to users, and on the other hand, also bring about some troubles to the users. For example, when an application is running, it is necessary to switch between different applications to view other application messages. Such operations would have some effects on user experience, resulting in that some users choose to delay or ignore information check, and in terms of message senders, effective reception of messages is delayed, which actually reduces communication efficiency of the message senders; and in terms of receivers, they hope to receive information without being disturbed.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the purpose of this summary is to present some concepts related to some exemplary non-limiting embodiments in simplified form as a prelude to more detailed descriptions of the various embodiments that follow in the disclosure.

An example, non-limiting objective of the present application is to provide an information sending solution.

To these and/or related ends, in a first aspect, an embodiment of the present application provides an information sending method, and the method includes:
receiving target information sent to at least one target receiving device by a sender; and
determining, according to state information of a receiver device corresponding to the at least one target receiving device, a forwarding policy of forwarding the target information to the receiver device.

In a second aspect, an embodiment of the present application provides an information sending apparatus, and the apparatus includes:
an information receiving module, configured to receive target information sent to at least one target receiving device by a sender; and
a policy determination module, configured to determine, according to state information of a receiver device corresponding to the at least one target receiving device, a forwarding policy of forwarding the target information to the receiver device.

In a third aspect of the embodiments of the present application, a computer readable storage device is provided, comprising at least one executable instruction, which, in response to execution, causes a system comprising a processor to perform operations, comprising:
receiving target information sent to at least one target receiving device by a sender; and
determining, according to state information of a receiver device corresponding to the at least one target receiving device, a forwarding policy of forwarding the target information to the receiver device.

In a fourth aspect of the embodiments of the present application, a device for information sending is provided, comprising a processor and a memory, wherein the memory storing a computer executable instruction, the processor being connected with the memory via a communication bus, and when the device is operating, the processor executes or facilitates execution of the executable instructions stored by the memory to cause the device to perform operations, comprising:
receiving target information sent to at least one target receiving device by a sender; and
determining, according to state information of a receiver device corresponding to the at least one target receiving device, a forwarding policy of forwarding the target information to the receiver device.

According to the method and the apparatus in the embodiments of the present application, a forwarding policy is determined according to state information of a receiver device, so that a receiver acquires information as much as it does not change a current state, thereby improving user experience of the receiver.

DETAILED DESCRIPTION

Figure 1:
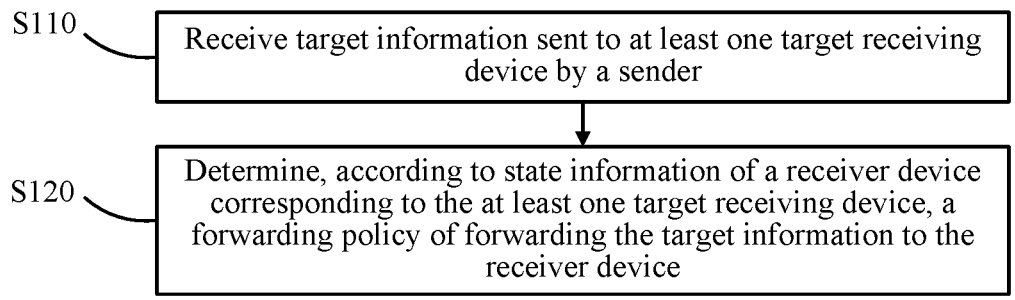
FIG. 1 is an example flowchart of an information sending method according to an embodiment of the present application.

Embodiments of the present application are described in detail hereinafter with reference to the accompanying drawings (the same reference numerals in several drawings indicate the same elements) and embodiments. The following embodiments are intended to describe the present application, but not to limit the scope of the present application.

An information sending method in embodiments of the present application runs on a third-party apparatus partially or wholly independent of a sender device and a receiver device. Such a third-party apparatus may be any device that may realize a function of transferring communication between a sender and a receiver, such as an Internet server (for example, an IM server and an SMS server), a home gateway, or an access point (AP) device.

As shown in FIG. 1, the information sending method according to an embodiment of the present application includes the following steps.

S110. Receive target information sent to at least one target receiving device by a sender.

According to different apparatuses that execute the method in the embodiment of the present application, target information sent to a receiver by a sender may be acquired directly or indirectly. For example, the target information is indirectly acquired from a device (an Internet server (for example, an IM servers and an SMS server), a home gateway, or an AP device) through which the sender sent the target information; or, when the apparatus that executes the method according to the embodiment of the present application partially or wholly belongs to any of the above device, the target information may be acquired directly. It should be noted that, the target information should carry identification information of the corresponding target receiving device, such as, an IM ID, a device ID, and an SIM card number.

S120. Determine, according to state information of a receiver device corresponding to the at least one target receiving device, a forwarding policy of forwarding the target information to the receiver device.

A method according to an embodiment of the present application is used to forward target information sent by a sender to a receiver, the forwarding policy means, upon receipt of the target information, how to process the target information and then send the processed target information to a corresponding receiver device, and in the method of the embodiment of the present application, the receiver device includes a target receiving device to which the sender originally wants to send the target information, and further includes other devices associated with the target receiving device. The other devices associated with the receiving device refer to other devices belonging to a receiver user and/or other devices that the receiver user can use currently, for example, the target receiving device is a smart phone of the receiver user, other devices associated with the smart phone may include a tablet PC and a smart watch of the user or a portable computer and a smart TV that the user can use currently, and the other devices associated with the target receiving device can communicate with the target receiving device. The state information includes information of an application state and/or a system state of the receiver device. The application state includes an application currently running on the device, such as, an IM application, a music playback application, or a reading application. The system state includes current states of interfaces of the device and/or an on/off state of a current screen and/or a current reminder mode, and the reminder mode includes at least one of the following reminder manners: a visual reminder, an audio reminder, and a touch reminder, for example, a current reminder mode of the device for received information (for example, a short message) is flashing (the screen and/or indicator) and/or vibration and/or an audio prompt.

To sum up, according to a method in an embodiment of the present application, a forwarding policy is determined according to state information of a receiver device, so that a receiver acquires information as much as it does not change a current state and improving user experience of the receiver.

In order to determine the forwarding policy, a method in an embodiment of the present application further includes the following step.

S130. Acquire the state information of the receiver device corresponding to the at least one target receiving device.

In a method of an embodiment of the present application, the state information may be acquired periodically or irregularly by polling the receiver device, and the state information may also be acquired in response to receipt of the target information. Moreover, step S130 may further include the following steps.

S131. Send a request for acquiring the state information to the target receiving device corresponding to the target information.

S132. Receive an acknowledgement to the request, the acknowledgement including the state information.

In addition, in a method of an embodiment of the present application, many forwarding policies may be determined according to different states of the receiver device, so as to fully improve user experience of the receiver.

In a possible embodiment, the state information at least includes an application state of the target receiving device, and the forwarding policy may be determined according to the application state of the target receiving device: determining, according to an application currently run on the target receiving device, the forwarding policy of forwarding the target information to the target receiving device in a manner corresponding to the application. For example, in response to that the application currently running is multiple IM applications, the target information is forwarded in a manner corresponding to any one of the IM applications; in response to that the application currently running is a music player, the target information is forwarded in a manner of voice inserting. It should be noted that, if the target receiving device currently runs many kinds of applications, the information may be forwarded in a manner corresponding to any kind of application.

In another possible embodiment, the state information at least includes a system state of the target receiving device, and the forwarding policy may be determined according to the system state of the target receiving device. The system state may include current states of interfaces of the device and/or an on/off state of a screen and/or a current reminder mode, the forwarding policy may be determined with reference to the states of the interfaces, the forwarding policy may be determined with reference to the on/off state of the screen, the forwarding policy may be determined with reference to the reminder mode, or the forwarding policy may be determined by comprehensively considering at least two factors in the current states of the interfaces, the on/off state of the screen and the reminder mode. For example, in response to that the current screen of the target receiving device is in an on state, the target information is forwarded to the target receiving device through a text message or a voice signal; in response to that the current screen of the target receiving device is in an on state but the reminder mode is a visual reminder in the case of mute, the target information is forwarded to the target receiving device through a text message; in response to that the current screen of the target receiving device is in an off state and the audio interface is in a connection state, the target information is forwarded to the target receiving device through a voice signal.

In still another possible embodiment, the state information at least includes an application state and a system state of the target receiving device, and the forwarding policy may be determined according to the application state and the system state of the target receiving device. According to the original intention of providing good user experience, the application state and the system state of the target receiving device are considered comprehensively. For example, when the target receiving device is running an IM application and the audio interface is in a connection state, the target information is forwarded to the target receiving device through a voice signal corresponding to the IM; when the target receiving device is running an IM application and is in a mute mode, the information is forwarded to the target receiving device through a short message corresponding to the IM; when the target receiving device is running an audio/video playback application and the audio interface is in a connection state, the information may be forwarded to the target receiving device through a voice signal; when the target receiving device and the audio interface are in a connection state and the screen is off, the information is forwarded to the target receiving device through a sound signal; and so on.

In still another possible embodiment, the state information at least includes a system state and/or an application state of the target receiving device and system states and/or application states of other devices associated with the target receiving device, and the state information may be considered comprehensively. For example, when the screen of the target receiving device is in an off state and the reminder mode is a mute mode, the forwarding policy of forwarding the target information to the target receiving device or the associated devices may be determined according to a policy similar to the state information of the target receiving device with reference to the state information of the associated devices, which is not repeated herein.

After the forwarding policy is determined with reference to the above process, the method in the embodiment of the present application further includes the following step.

S140. Forward the target information according to the forwarding policy.

The format of the target information determined according to the forwarding policy may be different from the format initially sent by the sender, and step S140 may further include the following step.

S141. Encapsulate the target information according to the forwarding policy, for example, convert information in a text format to information in a voice format, convert information encapsulated according to a first IM message to information encapsulated in a manner corresponding to a second IM message, and so on.

According to different factors referenced by specific sending policies, the target information may be forwarded to the target receiving device, and if the state information of other devices associated with the target receiving device includes identification information of the associated devices, the target information may also be forwarded to the other devices associated with the target receiving device.

In addition, by informing the sender device of the forwarding policy and other situations, the sender user may be prompted to send information according to the forwarding policy in subsequent communications, so as to save conversion and encapsulation procedures; the method in the embodiment of the present application may further include the following step.

S150. Send an information forwarding reminder to a sender device corresponding to the target information, for example, remind the sender user through a text message that the target information may be input in a manner determined by the forwarding policy, for example, directly input a text message or a voice signal, or send the target information by selecting an IM application the same as that of the receiver.

To sum up, according to the method in the embodiment of the present application, a forwarding policy is determined according to state information of a receiver device, various application and/or system states of the receiver device are considered comprehensively, which may realize information forwarding through good user experience of the receiver user as much as possible, so that the user acquires information without changing the current state.

Those skilled in the art should understand that, in the method of the specific embodiment of the present application, sequence numbers of the steps do not mean an order of execution, the order of execution of the steps should be determined according to functions and internal logic thereof, but should not pose any limitation to the implementation process of the specific embodiment of the present application.

An embodiment of the present application further provides an information sending apparatus, and the apparatus may be a third-party apparatus partially or wholly independent of an information sender and an information receiver. For example, the apparatus may be any device that may realize a function of transferring communication between a sender and a receiver, such as an Internet server (for example, an IM server and an SMS server), a home gateway, or an AP device, or partially or wholly belongs to the devices.

Figure 2:
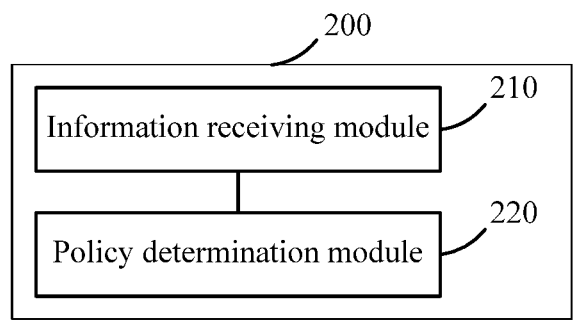
FIG. 2 is an example structural diagram of an information sending apparatus according to an embodiment of the present application.

As shown in FIG. 2, the information sending apparatus 200 in the embodiment of the present application includes the following modules.

An information receiving module 210 is configured to receive target information sent to at least one target receiving device by a sender.

According to different types of execution apparatuses, target information sent to a receiver by a sender may be acquired directly or indirectly by the information receiving module 210. For example, the target information is indirectly acquired from devices (an Internet server (for example, an IM server and an SMS server), a home gateway, or an AP device) through which the sender sent the target information; or, when the apparatus 200 partially or wholly belongs to any of the above device, the information receiving module 210 may directly acquire the target information. It should be noted that, the target information should carry identification information of the corresponding target receiving device, such as, an IM ID, a device ID, and an SIM card number.

A policy determination module 220 is configured to determine, according to state information of a receiver device corresponding to the at least one target receiving device, a forwarding policy of forwarding the target information to the receiver device.

An apparatus in an embodiment of the present application is configured to forward target information sent by a sender to a receiver, the forwarding policy means, upon receipt of the target information, how to process the target information and then send the processed target information to a corresponding receiver device, and in the apparatus of the embodiment of the present application, the receiver device includes a target receiving device to which the sender originally wants to send the target information, and further includes other devices associated with the target receiving device. The other devices associated with the receiving device refer to other devices belonging to a receiver user and/or other devices that the receiver user can use currently, for example, the target receiving device is a smart phone of the receiver user, other devices associated with the smart phone may include a tablet PC and a smart watch of the user or a portable computer and a smart TV that the user can use currently, and the other devices associated with the target receiving device can communicate with the target receiving device. The state information includes information of an application state and/or a system state of the receiver device. The application state includes an application currently running on the device, such as, an IM application, a music playback application, or a reading application. The system state includes current states of interfaces and/or an on/off state of a current screen and/or a current reminder mode, and the reminder mode includes at least one of the following reminder manners: a visual reminder, an audio reminder, and a touch reminder, for example, a current reminder mode of the device for received information (for example, short messages) is flashing (the screen and/or indicator) and/or vibration and/or audio cues.

To sum up, according to an apparatus in an embodiment of the present application, a forwarding policy is determined according to state information of a receiver device, so that a receiver acquires information as much as it does not change a current state, thereby improving user experience of the receiver.

Figure 3:
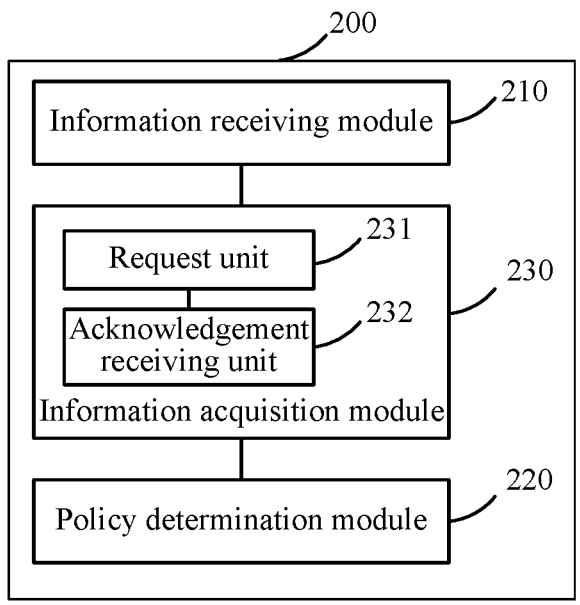
FIG. 3 is a second example structural diagram of an information sending apparatus according to an embodiment of the present application.

As shown in FIG. 3, in order to determine the forwarding policy, the apparatus in the embodiment of the present application further includes the following module.

An information acquisition module 230 is configured to acquire the state information of the receiver device corresponding to the at least one target receiving device.

The information acquisition module 230 may acquire the state information periodically or irregularly by polling the receiver device, and may also acquire the state information in response to receipt of the target information. Moreover, the information acquisition module 230 may further include the following units.

A request unit 231 is configured to send a request for acquiring the state information to the target receiving device corresponding to the target information.

An acknowledgement receiving unit 232 is configured to receive an acknowledgement to the request, the acknowledgement including the state information.

In addition, in an apparatus of embodiments of the present application, the policy determination module 220 may determine many sending policies according to different states of the receiver device, so as to fully improve user experience of the receiver.

Figure 4:
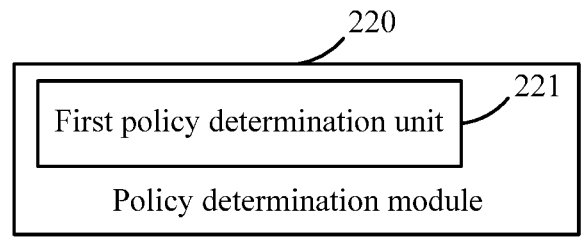
FIG. 4 is an example structural diagram of a policy determination module in an information sending apparatus according to an embodiment of the present application.

In a possible embodiment, the state information at least includes an application state of the target receiving device, and the policy determination module 220 may determine the forwarding policy according to the application state of the target receiving device. In this case, as shown in FIG. 4, the policy determination module 220 may include a first policy determination unit 221, configured to determine, according to an application currently running on the target receiving device, the forwarding policy of forwarding the target information to the target receiving device in a manner corresponding to the application. For example, in response to that the application currently running is multiple IM applications, the target information is forwarded in a manner corresponding to any one of the IM applications; in response to that the application currently running is a music player, the target information is forwarded in a manner of voice inserting. It should be noted that, if the target receiving device currently runs many kinds of applications, the first policy determination unit 221 may forward the information in a manner corresponding to any kind of application.

In another possible embodiment, the state information at least includes a system state of the target receiving device, and the policy determination module 220 may determine the forwarding policy according to the system state of the target receiving device. The system state may include current states of interfaces of the device and/or an on/off state of a screen and/or a current reminder mode, the forwarding policy may be determined with reference to the states of the interfaces, the forwarding policy may be determined with reference to the on/off state of the screen, the forwarding policy may be determined with reference to the reminder mode, or the forwarding policy may be determined by comprehensively considering at least two factors in the current states of the interfaces, the on/off state of the screen and the reminder mode. For example, in response to that the current screen of the target receiving device is in an on state, the target information is forwarded to the target receiving device through a text message or a voice signal; in response to that the current screen of the target receiving device is in an on state but the reminder mode is a visual reminder in the case of mute, the target information is forwarded to the target receiving device through a text message; in response to that the current screen of the target receiving device is in an off state and the audio interface is in a connection state, the target information is forwarded to the target receiving device through a voice signal.

In still another possible embodiment, the state information at least includes an application state and a system state of the target receiving device, and the policy determination module 220 may determine the forwarding policy according to the application state and the system state of the target receiving device. According to the original intention of providing good user experience, the application state and the system state of the target receiving device are considered comprehensively. For example, when the target receiving device is running an IM application and the audio interface is in a connection state, the target information is forwarded to the target receiving device through a voice signal corresponding to the IM; when the target receiving device is running an IM application and is in a mute mode, the information is forwarded to the target receiving device through a short message corresponding to the IM; when the target receiving device is running an audio/video playback application and the audio interface is in a connection state, the information may be forwarded to the target receiving device through a voice signal; when the target receiving device and the audio interface are in a connection state and the screen is off, the information is forwarded to the target receiving device through a sound signal; and so on.

In still another possible embodiment, the state information at least includes a system state and/or an application state of the target receiving device and system states and/or application states of other devices associated with the target receiving device, and the state information may be considered comprehensively. For example, when the screen of the target receiving device is in an off state and the reminder mode is a mute mode, the forwarding policy of forwarding the target information to the target receiving device or the associated devices may be determined according to a policy similar to the state information of the target receiving device with reference to the state information of the associated devices, which is not repeated herein.

Figure 5:
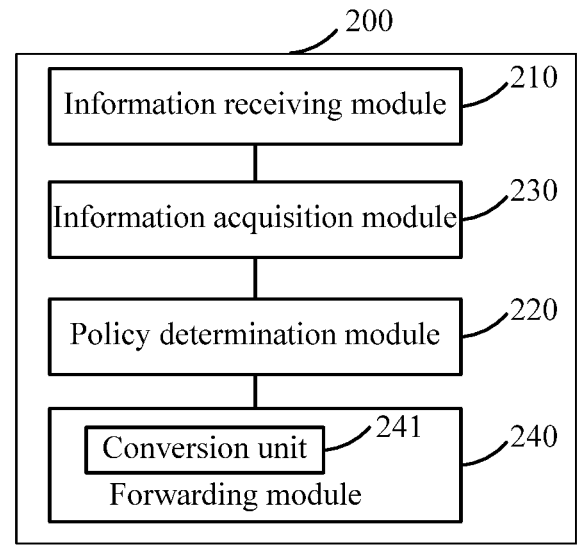
FIG. 5 is a third example structural diagram of an information sending apparatus according to an embodiment of the present application.

As shown in FIG. 5, the apparatus 200 in the embodiment of the present application may further include the following module.

A forwarding module 240 is configured to: after the policy determination module 220 determines the forwarding policy, forward the target information according to the forwarding policy.

The format of the target information determined according to the forwarding policy may be different from the format initially sent by the sender, and the forwarding module 240 may further include the following unit.

A conversion unit 241 is configured to encapsulate the target information according to the forwarding policy, for example, convert information in a text format to information in a voice format, convert information encapsulated according to a first IM message to information encapsulated in a manner corresponding to a second IM message, and so on.

According to different factors referenced by specific sending policies, the target information may be forwarded to the target receiving device, and if the state information of other devices associated with the target receiving device includes identification information of the associated devices, the target information may also be forwarded to the other devices associated with the target receiving device.

Figure 6:
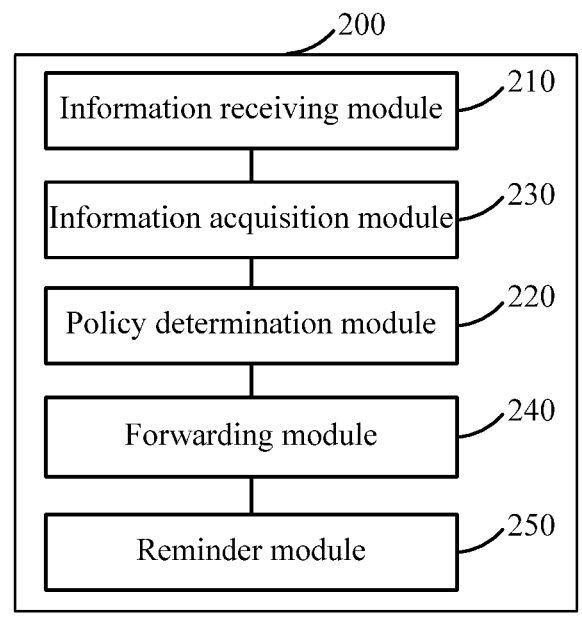
FIG. 6 is a fourth example structural diagram of an information sending apparatus according to an embodiment of the present application.

In addition, by informing the sender device of the forwarding policy and other situations, the sender user may be prompted to send information according to the forwarding policy in subsequent communications, so as to save conversion and encapsulation procedures. Correspondingly, as shown in FIG. 6, the apparatus in the embodiment of the present application may further include the following module.

A reminder module 250 is configured to send an information forwarding reminder to a sender device corresponding to the target information, for example, remind the sender user through a short message that the target information may be input in a manner determined by the forwarding policy, for example, directly input a text message or a voice signal, or send the target information by selecting an IM application the same as that of the receiver.

To sum up, according to an apparatus in an embodiment of the present application, a forwarding policy is determined according to state information of a receiver device, various application and/or system states of the receiver device are considered comprehensively, which may realize information forwarding through good user experience of the receiver user as much as possible, so that the user acquires information without changing the current state.

Various embodiments of the present application are further described below through specific examples.

Example 1

User A sends, through a mobile phone, a text message to a mobile phone of User B. According to a possible embodiment of the present application, an SMS server sends a request for acquiring state information of the User B's device to the User B's mobile phone before the text message is sent, and receives an automatic acknowledgement from the User B's mobile phone. It may be known according to the state information included in the acknowledgement that the current screen of the User B's mobile phone is off and the audio interface is in a connection state, and thus it may be inferred that the User B may be using the mobile phone to listen to audio information or using the mobile phone to watch video information, thereby determining to forward information input by the User A through a voice signal. In this case, the SMS server automatically converts a short message input by the user from a text format to a voice signal and sends the converted short message.

Example 2

User A sends, through a mobile phone, a first IM application message to a mobile phone of User B. According to a possible embodiment of the present application, an information sending apparatus as a part of a first IM application server sends a request for acquiring state information of the User B's device to the User B's mobile phone, and receives an automatic acknowledgement from the User B's mobile phone. It may be known according to the state information included in the acknowledgement that the User B's mobile phone is currently running a second IM application, thereby determining to forward information input by the User A in a manner corresponding to the second IM application. In this case, the information sending apparatus automatically encapsulates the first IM application message into a second IM application message and sends the second IM application message.

Example 3

User A sends, through a mobile phone, a first IM application message to a mobile phone of User B. According to a possible embodiment of the present application, a first IM application server sends a request for acquiring state information of the User B's device to the User B's mobile phone before forwarding the message, and receives an automatic acknowledgement from the User B's mobile phone. It may be known according to the state information included in the acknowledgement that the current screen of the User B's mobile phone is off and muted and that the User B's tablet PC is running a second IM application, thereby determining to forward information input by the User A in a manner corresponding to the second IM application. In this case, the first IM application server automatically encapsulates the first IM application message input by the user into a second IM application message and sends the second IM application message.

Figure 7:
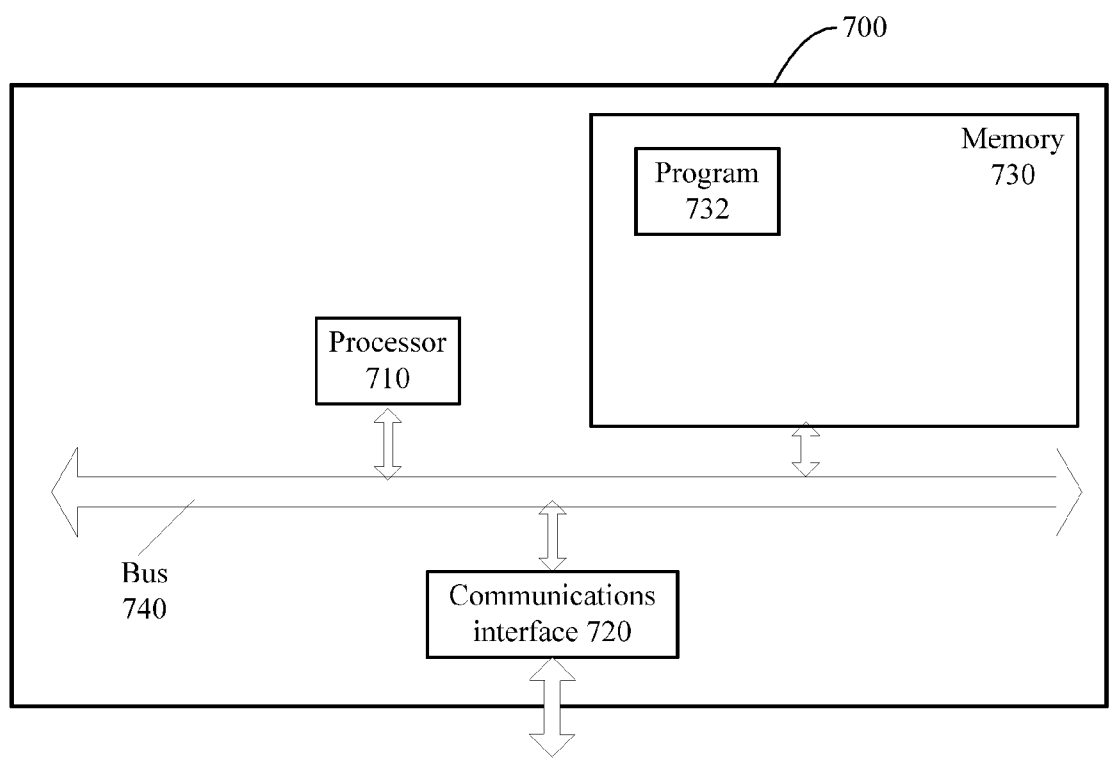
FIG. 7 is a fifth example structural diagram of an information sending apparatus according to an embodiment of the present application.

FIG. 7 is a schematic structural diagram of another information sending apparatus 700 according to an embodiment of the present application, and the specific embodiment of the present application does not limit specific implementation of the information sending apparatus 700. As shown in FIG. 7, the information sending apparatus 700 may include:

a processor 710, a communications interface 720, a memory 730, and a communications bus 740.

The processor 710, the communications interface 720, and the memory 730 complete mutual communications via the communications bus 740.

The communications interface 720 is configured to communicate with a network element such as a client.

The processor 710 is configured to execute a program 732, and specifically, may implement relevant functions of the information sending apparatus in the apparatus embodiment shown in FIG. 2 to FIG. 6.

Specifically, the program 732 may include a program code, the program code including a computer operation instruction.

The processor 710 may be a central processing unit (CPU), or an application specific integrated circuit (ASIC), or be configured to be one or more integrated circuits which implement the embodiments of the present application.

The memory 730 is configured to store the program 732. The memory 730 may include a high-speed RAM memory, and may also include a non-volatile memory, for example, at least one magnetic disk memory. The program 732 may specifically perform the following steps:

receiving target information sent to at least one target receiving device by a sender; and determining, according to state information of a receiver device corresponding to the at least one target receiving device, a forwarding policy of forwarding the target information to the receiver device.

Although the subject matter described herein is provided in a general context executed in combination with execution of an operating system and applications on a computer system, those skilled in the art may realize that other embodiments may also be executed in combination with other types of program modules. Generally, the program modules include routines, programs, components, data structures and other types of structures executing particular tasks or implement particular abstract data types. Those skilled in the art may understand that, the subject matter described herein may be practiced with other computer system configurations, including handheld devices, multi-processor systems, microprocessor-based or programmable consumer electronic products, minicomputers, mainframe computers, etc., and may also be used in a distributed computing environment in which tasks are executed by remote processing devices connected via a communication network. In the distributed computing environment, the program modules may be located in both local and remote memory storage devices.

It may be appreciated by those of ordinary skill in the art that each exemplary unit and method step described with reference to the embodiments disclosed herein may be implemented by electronic hardware or a combination of computer software and electronic hardware. Whether these functions are executed in a hardware mode or a software mode depends on particular applications and design constraint conditions of the technical solution. The professional technicians may use different methods to implement the functions described with respect to each particular application, but such embodiment should not be considered to go beyond the scope of the present application.

If the functions are implemented in the form of a software functional unit and is sold or used as an independent product, it may be stored in a computer-readable storage medium. Based on such understanding, the technical solution of the present application essentially or the part which contributes to the prior art or a part of the technical solution may be embodied in the form of a software product, and the computer software product is stored in a storage medium, and includes several instructions for enabling a computer device (which may be a personal computer, a server, a network device, or the like) to execute all or some steps of the method described in each embodiment of the present application. The foregoing computer-readable storage medium includes physical volatile and non-volatile, removable and non-removable media implemented in any manner or technology of storing information such as computer-readable instructions, data structures, program modules or other data. The computer-readable storage medium specifically includes, but is not limited to, a USB disk, a mobile hard disk, a read-only memory (ROM), a random access memory (RAM), an erasable programmable read-only memory (EPROM), an electrically erasable programmable read-only memory (EEPROM), a flash memory or another solid state memory technology, a CD-ROM, a digital versatile disk (DVD), an HD-DVD, a Blue-Ray or other optical storage devices, magnetic tape, magnetic disk storage or other magnetic storage devices, or any other media that can be used to store required information and can be accessed by a computer.

The above embodiments are merely used to describe the present application, instead of limiting the present application; various alterations and variants may be made by those of ordinary skill in the art without departing from the spirit and scope of the present application, so all equivalent technical solutions also belong to the scope of the present application, and the scope of patent protection of the present application should be defined by claims.

What is claimed is:

1. A method, performed by a device comprising a processor that is independent from a sender device and at least one target receiving device, the method comprising:

receiving target information that was sent to the at least one target receiving device by the sender device;

determining, according to state information of a receiver device corresponding to the at least one target receiving device, a forwarding policy of forwarding the target information to the receiver device, the state information comprising information about an application state of an application of the receiver device or a system state of the receiver device; and performing the forwarding of the target information to the receiver device according to the forwarding policy, resulting in the target information being acquired by the receiver device without changing the state of the receiver device corresponding to the state information.

2. The method of claim 1, further comprising:

acquiring the state information of the receiver device corresponding to the at least one target receiving device.

3. The method of claim 2, wherein the acquiring the state information of the receiver device corresponding to the at least one target receiving device comprises:

sending a request for acquiring the state information; and receiving an acknowledgement to the request, the acknowledgement comprising the state information.

4. The method of claim 3, wherein the sending the request for acquiring the state information comprises:

sending the request in response to receipt of the target information.

5. The method of claim 1, wherein the application state of the application on the receiver device comprises a state in which the application is currently executing on the receiver device.

6. The method of claim 5, wherein the determining, according to the state information of the receiver device corresponding to the at least one target receiving device, the forwarding policy of forwarding the target information to the receiver device comprises:
  determining the forwarding policy according to the application state of the application of the receiver device corresponding to the at least one target receiving device.

7. The method of claim 6, wherein the determining, according to the state information of the receiver device corresponding to the at least one target receiving device, the forwarding policy of forwarding the target information to the receiver device comprises:
  determining the forwarding policy of forwarding the target information in a manner corresponding to the application currently executing on the receiver device corresponding to the at least one target receiving device.

8. The method of claim 5, wherein the system state is a first system state, wherein the application state of the application of the receiver device is a first application state, and wherein the state information further comprises at least one of a second application state or a second system state of another device associated with the at least one target receiving device.

9. The method of claim 8, wherein the determining, according to the state information of the receiver device corresponding to the at least one target receiving device, the forwarding policy of forwarding the target information to the receiver device comprises:
  determining the forwarding policy according to the at least one of the first application state or the first system state and at least one of the second application state or the second system state.

10. The method of claim 1, wherein the determining, according to the state information of the receiver device corresponding to the at least one target receiving device, the forwarding policy of forwarding the target information to the receiver device comprises:
  determining the forwarding policy according to the system state of the receiver device corresponding to the at least one target receiving device.

11. The method of claim 10, wherein the system state comprises an on or off state of a current screen, or a current reminder mode.

12. The method of claim 11, wherein the current reminder mode comprises at least one of a visual reminder, an audio reminder, or a touch reminder.

13. The method of claim 1, wherein the determining, according to the state information of the receiver device corresponding to the at least one target receiving device, the forwarding policy of forwarding the target information to the receiver device comprises:
  determining the forwarding policy according to the at least one of the application state of the application of the receiver device or the system state of the receiver device corresponding to the at least one target receiving device.

14. The method of claim 1, wherein the forwarding the target information according to the forwarding policy comprises:
  encapsulating the target information according to the forwarding policy.

15. The method of claim 1, further comprising:
  sending an information forwarding reminder to the sender device corresponding to the target information.

16. The method of claim 1, wherein the application state comprises an indication of the application that is currently being executed by the receiver device.

17. An apparatus, which is different from a sender device and a target receiving device, comprising:
  a processor, coupled to a memory, that executes or facilitates execution of executable modules, comprising:
    an information receiving module configured to receive target information that was sent to the target receiving device by the sender device;
    a policy determination module configured to determine, according to state information of a receiver device corresponding to the target receiving device, a forwarding policy relating to forwarding the target information to the receiver device, the state information comprising information about an application state of the receiver device or a system state of the receiver device; and
    a forwarding module configured to forward the target information according to the forwarding policy, resulting in the target information being acquired by the receiver device without a change in the state of the receiver device corresponding to the state information.

18. The apparatus of claim 17, wherein the executable modules further comprise:
  an information acquisition module configured to acquire the state information of the receiver device corresponding to the target receiving device.

19. The apparatus of claim 18, wherein the information acquisition module comprises:
  a request unit configured to send a request to acquire the state information; and
  an acknowledgement receiving unit configured to receive an acknowledgement to the request, the acknowledgement comprising the state information.

20. The apparatus of claim 19, wherein the request unit sends the request in response to receipt of the target information.

21. The apparatus of claim 18, wherein the policy determination module determines the forwarding policy according to the application state of the receiver device corresponding to the target receiving device.

22. The apparatus of claim 21, wherein the policy determination module comprises:
  a first policy determination unit configured to determine the forwarding policy relating to forwarding the target information as a function of an application currently executing on the target receiving device.

23. The apparatus of claim 21, wherein the policy determination module determines the forwarding policy according to the system state of the receiver device corresponding to the target receiving device.

24. The apparatus of claim 18, wherein the policy determination module determines the forwarding policy according to the application state or the system state of the receiver device corresponding to the target receiving device.

25. The apparatus of claim 18, wherein the policy determination module determines the forwarding policy according to the application state of the receiver device corresponding to the target receiving device or the system state of the receiver device corresponding to the target receiving device, and another application state or another system state of another device associated with the target receiving device.

26. The apparatus of claim 17, wherein the forwarding module comprises:
a conversion unit configured to encapsulate the target information according to the forwarding policy.

27. The apparatus of claim 17, wherein the executable modules further comprise:
a reminder module configured to send an information forwarding reminder to the sender device corresponding to the target information.

28. The apparatus of claim 17, wherein the system state comprises an indication of a current state of an interface of the receiver device, an indication of whether a screen of the receiver device is on, or a reminder mode of the receiver device.

29. The apparatus of claim 28, wherein the reminder mode of the receiver device comprises a visual reminder, an audio reminder, or a touch reminder.

30. A computer readable storage device, comprising at least one executable instruction, which, in response to execution, causes a system, which comprises a processor and is independent from a sender device and at least one target receiving device, to perform operations, comprising:
receiving target information that was sent to the at least one target receiving device by the sender device;
determining, according to state information of a receiver device corresponding to the at least one target receiving device, a forwarding policy applicable to forwarding the target information to the receiver device, the state information comprising information about an application state of the receiver device or a system state of the receiver device; and
forwarding the target information according to the forwarding policy, while maintaining the state of the receiver device corresponding to the state information.

31. A device for information sending, which is a different device from a sender device and a target receiving device, comprising a processor and a memory, wherein the memory stores executable instructions, the processor being connected with the memory via a communication bus, and when the device is operating, the processor executes or facilitates execution of the executable instructions stored by the memory to cause the device to perform operations, comprising:
receiving target information sent to the at least one target receiving device by the sender device;
determining, according to state information of a receiver device corresponding to the at least one target receiving device, a forwarding policy relating to forwarding the target information to the receiver device, the state information comprising information about an application state of the receiver device or a system state of the receiver device; and
forwarding the target information according to the forwarding policy, resulting in the state of the receiver device corresponding to the state information remaining unchanged.

* * * * *